C. J. MANCL & N. A. NELSON.
AUTOMOBILE SIGNAL.
APPLICATION FILED NOV. 1, 1915.
1,238,169.
Patented Aug. 28, 1917.
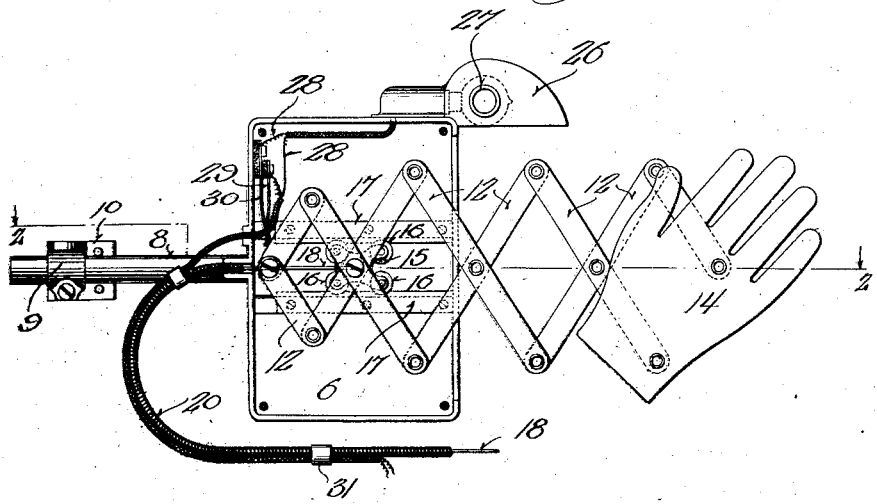
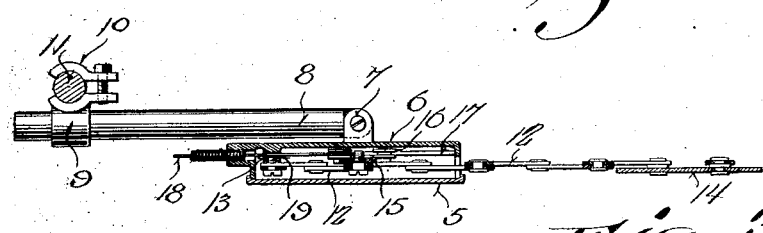
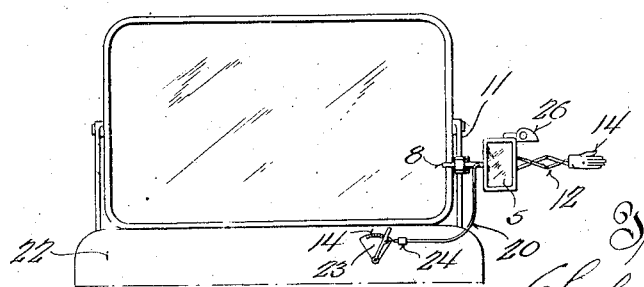
Inventors:
Charles J. Mancl
Nels A. Nelson
By Geo. W. Young
Attorney

UNITED STATES PATENT OFFICE.

CHARLES J. MANCL AND NELS A. NELSON, OF MILWAUKEE, WISCONSIN, ASSIGNORS, BY DIRECT AND MESNE ASSIGNMENTS, TO THE AMERICAN SAFETY SIGNAL COMPANY, OF MILWAUKEE, WISCONSIN.

AUTOMOBILE-SIGNAL.

1,238,169.  Specification of Letters Patent.  Patented Aug. 28, 1917.

Application filed November 1, 1915. Serial No. 58,958.

*To all whom it may concern:*

Be it known that we, CHARLES J. MANCL and NELS A. NELSON, said CHARLES J. MANCL being a citizen of the United States and said NELS A. NELSON being a subject of the King of Norway, but having declared his intention to become a citizen of the United States, and residents of Milwaukee, in the county of Milwaukee and State of Wisconsin, have invented certain new and useful Improvements in Automobile Signals; and we do hereby declare that the following is a full, clear, and exact description thereof.

The present invention is directed to new and useful improvements in automobile signals particularly of that type including a movable indicator member which indicates the driver's intention with respect to movement of the automobile.

It is the object of the present invention to provide an exceedingly simple indicator which may very readily be attached to an automobile and readily operated.

It is more specifically the object to provide such an indicator which will simulate the driver's hand whereby the device may be used under present existing systems of traffic customs and rule to impart the usual signals in the same manner as is imparted manually by the driver.

A further object is to provide such an indicating device which is attached to the wind shield structure of an automobile, and which includes a housing which forms a support for the usual sight mirror whereby an exceedingly compact arrangement is had.

A still further object resides in the provision of a means associated with the signal for completing an electric circuit upon the signal being actuated to operative position whereby a lamp is lighted to indicate such actuation.

With the above and other objects and advantages in view, the invention resides more particularly in the novel combination, arrangement and formation of parts more particularly hereinafter described and particularly pointed out in the appended claim.

Reference is had to the accompanying drawings wherein similar characters of reference designate corresponding parts throughout the several views and in which:

Figure 1 is a side elevation of the improved signal, in a partially extended position, and showing the mirror plate of the casing removed to disclose the operating means of the signal hand.

Fig. 2 is a horizontal sectional view on the line 2—2 of Fig. 1.

Fig. 3 is an elevational view of the dash board and wind shield structure of an automobile showing the signal associated therewith.

Referring now more particularly to the accompanying drawings, there is provided a casing, one side wall 5 of which has a mirror surface formed thereon, and the other side wall 6 of which carries an ear 7 to which is secured an attaching rod 8 adjustably engaged in a clamping loop 9 which is carried by a second loop 10 clamped on one of the wind shield uprights 11 of an automobile. The casing is thus adjustably mounted whereby it may be secured in any desired position for the driver to attain a proper view in the mirror thereof.

The indicator member proper comprises lazy tongs 12, the innermost links of which are pivoted to a lug 13 provided in the inner edge portion of the casing. A plate 14 formed in the shape of a hand comprises one of the outermost links and thus when the lazy tongs are restricted, the hand lies concealed within the casing in a substantially vertical position, and when the tongs are extended, is projected outwardly of the casing in a horizontal position.

For actuating the indicator hand, a carriage plate 15 is pivotally secured to the tongs at the cross section of an inner pair of links and carries grooved pulleys 16 which ride on horizontal tracks formed by offset edges of strips 17 carried by one side wall of the casing. A flexible actuating rod 18 is connected to the carriage and is slidably passed through an opening 19 in the lug 13, and projected outwardly of the casing and through a flexible housing 20, preferably formed of wire coil. The end of the actuating rod is pivoted to a lever 21 carried in the present instance on the dashboard 22 of an automobile and coöperating with a rack segment 24 whereby the hand is held in either extended or retracted position. The adjacent end of the housing is secured at 25, adjacent the lever 21, and thus the other end of the housing and of the flexible actuating rod, may be moved in adjustment of the casing to desired positions without affecting the operation of the lazy tongs. As the lazy tongs are pivoted to the lug 13 at one point, and carried by the carriage 15 at another point, they are thus held against frictional engagement with the casing, and may thus be easily operated.

A lamp casing 26 is carried on the top edge of the indicator casing and projects outwardly thereof and houses a lamp 27 from which extend wires 28 to a pair of spaced contacts 29 and 30 respectively, disposed in the casing at the upper portion of the inner edges thereof and spaced apart longitudinally of the casing. The contact 30 has its lower end extended below the contact 29 and is normally urged by its resiliency into engagement therewith, but is held out of engagement when the hand is in retracted position by engagement of the adjacent tong links with its inwardly offset end. Thus when the hand is in extended position the contacts close a circuit to light the lamp 27. The wires 28 are preferably extended outwardly of the casing and along the housing 20 of the actuating rod, to which housing they are secured by suitable clips 31.

An exceedingly simple and compact device has thus been provided which may be readily operated to signal the intention of the driver in a manner similar to the usual manual signal of holding out the hand to indicate an intention to turn.

The present device is thus adapted to interpret the usual traffic customs in the usual manner. Although the operating means for the indicator has been shown as adapted to the dash board of an automobile, it is not desired to limit the present invention as it will be readily understood that the flexible operating rod 18 and its housing 20 could be extended to any desired position, as on the steering wheel and the rod could be manipulated in any desired manner to produce a movement of the indicator.

We claim:

A signal device for motor vehicles comprising a casing having an open outer front portion, the inner surface of one side of the casing being provided with centrally located spaced parallel transversely extending offset guide portions, lazy tongs slidable through the opening of the casing and having their inner ends pivotally mounted centrally within the rear of the casing, rollers carried by one side of the tongs and engaging the offset guide portions to prevent the tong having other than transverse movements relative to the casing, and a signal having spaced pivotal connection with the outer ends of the end members of the tongs, said signal being connected to said members to lie to one side thereof and in overlapping relation with said members, and means for operating the tong to project or retract the signal relative to the casing.

In testimony that we claim the foregoing we have hereunto set our hands at Milwaukee, in the county of Milwaukee and State of Wisconsin, in the presence of a witness.

CHARLES J. MANCL.
NELS A. NELSON.

Witness:
M. E. DOWNEY.